(12) United States Patent
Utermoehlen et al.

(10) Patent No.: US 11,150,111 B2
(45) Date of Patent: Oct. 19, 2021

(54) ROTATIONAL ANGLE SENSOR

(71) Applicant: Robert Bosch GmbH, Stuttgart (DE)

(72) Inventors: Fabian Utermoehlen, Lippstadt (DE); Andreas Merz, Freiberg am Necker (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 611 days.

(21) Appl. No.: 16/080,964

(22) PCT Filed: Feb. 28, 2017

(86) PCT No.: PCT/EP2017/054598
§ 371 (c)(1),
(2) Date: Aug. 29, 2018

(87) PCT Pub. No.: WO2017/148917
PCT Pub. Date: Sep. 8, 2017

(65) Prior Publication Data
US 2021/0190545 A1    Jun. 24, 2021

(30) Foreign Application Priority Data
Feb. 29, 2016    (DE) ...................... 10 2016 203 234.8

(51) Int. Cl.
*G01D 5/20* (2006.01)
*G01B 7/30* (2006.01)
(Continued)

(52) U.S. Cl.
CPC .............. *G01D 5/2086* (2013.01); *G01B 7/30* (2013.01); *G01D 5/00* (2013.01); *G01P 3/44* (2013.01); *H02K 3/28* (2013.01)

(58) Field of Classification Search
CPC ................................ G01D 5/2086; G01B 7/30
See application file for complete search history.

(56) References Cited

U.S. PATENT DOCUMENTS 6,628,038 B1    9/2003 Shikayama et al.
8,129,985 B2 *    3/2012 Lee .................. G01D 5/202
                                              324/207.25
(Continued)

FOREIGN PATENT DOCUMENTS

CN    1950676 A    4/2007
CN    102822634 A    12/2012
(Continued)

OTHER PUBLICATIONS

International Search Report corresponding to PCT Application No. PCT/EP2017/054598, dated Jun. 22, 2017 (German and English language document) (5 pages).

*Primary Examiner* — Reena Aurora
(74) *Attorney, Agent, or Firm* — Maginot, Moore & Beck LLP (57) ABSTRACT

A rotational angle sensor includes a stator element and rotor element. The stator element has a stator transmitting coil and stator receiving coil. The rotor element is rotatably mounted about a rotation axis, relative to the stator element, and has a rotor receiving coil and rotor transmitting coil electrically connected to each other. The rotor receiving coil is inductively coupled to the stator transmitting coil such that an electromagnetic field produced by the stator transmitting coil induces a current in the rotor receiving coil that flows through the rotor transmitting coil and causes the rotor transmitting coil to produce a further electromagnetic field. The stator receiving coil is inductively coupled to the rotor transmitting coil such that the inductive coupling between the stator receiving coil and the rotor transmitting coil is configured with reference to a rotational angle between the stator element and the rotor element, and such that the further electromagnetic field induces an angle-dependent alternating voltage in the stator receiving coil. The stator transmitting coil has a first circular outer partial winding, (Continued)

and a first circular inner partial winding positioned within and electrically connected to the first outer partial winding such that the first inner partial winding has an opposite current flow with respect to the first outer partial winding. The rotor receiving coil has a second circular outer partial winding and a second circular inner partial winding positioned within and electrically connected to the second outer winding such that the second inner winding has an opposite current flow with respect to the second outer partial winding. The first and second outer partial windings, and the first and second inner partial windings are oriented with respect to each other, respectively.

10 Claims, 4 Drawing Sheets

(51) Int. Cl.
  *H02K 3/28* (2006.01)
  *G01D 5/00* (2006.01)
  *G01P 3/44* (2006.01)

(56) References Cited

U.S. PATENT DOCUMENTS

| | | | |
|---|---|---|---|
| 8,729,887 B2* | 5/2014 | Suzuki | H02K 24/00 |
| | | | 324/207.16 |
| 10,845,216 B2* | 11/2020 | Utermoehlen | G01D 5/2073 |
| 10,921,155 B2* | 2/2021 | Shaga | G01D 3/08 |
| 2005/0225320 A1 | 10/2005 | Lee | |
| 2009/0153344 A1 | 6/2009 | Kim | |
| 2012/0007592 A1 | 1/2012 | Manabe et al. | |

FOREIGN PATENT DOCUMENTS

| | | |
|---|---|---|
| DE | 10 2008 012 922 A1 | 9/2009 |
| DE | 11 2008 002 563 T5 | 7/2010 |
| DE | 11 2008 003 394 T5 | 11/2010 |
| EP | 0 909 955 B1 | 4/1999 |
| EP | 2 570 776 A2 | 3/2013 |
| JP | H11-325964 A | 11/1999 |
| JP | 2007-532872 A | 11/2007 |
| JP | 2010-540896 A | 12/2010 |
| JP | 2013-518247 A | 5/2013 |

* cited by examiner

ROTATIONAL ANGLE SENSOR

This application is a 35 U.S.C. § 371 National Stage Application of PCT/EP2017/054598, filed on Feb. 28, 2017, which claims the benefit of priority to Serial No. DE 10 2016 203 234.8, filed on Feb. 29, 2016 in Germany, the disclosures of which are incorporated herein by reference in their entirety.

The disclosure relates to a rotational angle sensor which can be used to determine, for example, a rotational angle between a shaft and a further component.

BACKGROUND

To measure rotational angles, rotational angle sensors in which a magnet is rotated over a corresponding magnetic field sensor are known for example. The measurement of the magnetic field vector then allows the rotational angle to be deduced. Such sensors also react to external magnetic fields, which are caused for example by a current flowing through power cables arranged alongside, and can be very sensitive to interference.

Another type of rotational angle sensor uses an eddy current effect. In this case, for example, a metallic target, is moved over sensor coils, which are supplied with an AC voltage and induce an eddy current in the target. This causes a reduction in the inductances of the sensor coils and allows the rotational angle to be deduced from a change in frequency, for example, the coils form part of an oscillating circuit, the resonant frequency of which shifts when there is a change in the inductance. However, this type of rotational angle sensor may have a high cross sensitivity to installation tolerances (especially tilting of the target). The frequency generated may also be disturbed by external electromagnetic fields (injection locking), since frequencies in the range of several tens of MHz are usually used.

EP 0 909 955 B1 has a rotational angle sensor with planar conductor loops which are short-circuited on a target and interact with the alternating electromagnetic field of an excitation coil.

SUMMARY

Embodiments of the present disclosure can advantageously facilitate the provision of a rotational angle sensor which can be produced in a particularly economical fashion, with it supplying measurement signals that are easy to evaluate.

Ideas relating to embodiments of the present disclosure can be considered as being based on, inter alia, the concepts and discoveries described below.

The disclosure relates to a rotational angle sensor which can be used in particular in an environment with strong electromagnetic disturbance fields. For example, the rotational angle sensor can be used in the engine compartment or in the vicinity of the engine compartment of a vehicle, for example for determining a position of a throttle valve, a rotor position of a BLDC motor, a position of a gas pedal or a position of a camshaft. The rotational angle sensor described below is cost-effective, requires little installation space and is based on a simple measuring principle.

According to an embodiment of the disclosure, the rotational angle sensor comprises a stator element having a stator transmitting coil and a stator receiving coil; a rotor element, rotatably mounted about an axis of rotation with respect to the stator element, having a rotor receiving coil and a rotor transmitting coil, which are electrically connected to one another; wherein the rotor receiving coil is inductively coupled to the stator transmitting coil such that an electromagnetic field produced by the stator transmitting coil induces a current in the rotor receiving coil, said current flowing through the rotor transmitting coil such that the rotor transmitting coil produces a further electromagnetic field; wherein the stator receiving coil is inductively coupled to the rotor transmitting coil such that the inductive coupling depends on a rotational angle between the stator element and the rotor element and the further electromagnetic field produced by the rotor transmitting coil induces an angle-dependent AC voltage in the stator receiving coil.

By way of example, an AC voltage having a frequency in the range of a few MHz (preferably 5 MHz) can be applied to the stator transmitting coil, which is arranged on a stator printed circuit board, for example. As a result, an alternating electromagnetic field arises, which couples into the rotor receiving coil and induces a corresponding AC voltage there. Connected in series with the rotor receiving coil is a rotor transmitting coil which, once again, produces an alternating electromagnetic field and radiates the latter back onto the stator element, where it induces an angle-dependent AC voltage in one or more stator receiving coils, which can also be arranged on the stator printed circuit board, for example. Overall, coupling between the stator transmitting coil and the one or more stator receiving coils is influenced in a rotational-angle-dependent manner. The typical value range of the coupling factor lies between −0.3 and +0.3. By demodulating the signal induced in the stator receiving coil or coils with the carrier signal (the signal of the stator transmitting coil), it is possible to deduce the magnitude and phase of the coupling. This magnitude can vary continuously with the rotational angle. The phase angle of the coupling ideally can be 0° or 180°.

If the rotor transmitting coil and the stator receiving coils are configured in such a way that they respectively produce substantially sinusoidal signals, the rotational angle can be determined from these signals in a particularly simple manner. If use is made of two receiving coils with a 90° phase offset in relation to the measurement range, it is possible by multiplying the magnitude by the cosine of the phase to transfer the two measurement signals into an (ideally) offset-free sin/cos system. If use is made of three receiving coils with a 120° phase offset in relation to the measurement range, a three-phase sine signal arises, which can be transferred into a sin/cos system by applying a Clarke transformation. In both cases, the rotational angle can then be deduced by applying the arctan function to the transformed signal in the sin/cos system.

Further, the stator transmitting coil has a circular outer partial winding and a circular inner partial winding, which is arranged within the outer partial winding and electrically connected to the outer partial winding in such a way that it is oriented in the opposite sense to the outer partial winding in respect of a current flow. The rotor receiving coil has a circular outer partial winding and a circular inner partial winding, which is arranged within the outer partial winding and electrically connected to the outer partial winding in such a way that it is oriented in the opposite sense to the outer partial winding in respect of a current flow. Expressed differently, both the stator transmitting coil and the rotor receiving coil each have two partial windings, which are arranged within one another and arranged in the opposite sense.

Here, in respect of a current, flew, partial windings oriented in the opposite sense can be designed in such a way that, in the case of a current flow through the associated coil, the partial windings are respectively passed by the current in a left-hand sense or a right-hand sense. A partial winding of a coil can be a conductor portion of the coil which surrounds the same or substantially the same area. The two partial windings of the stator transmitting coil and/or the rotor receiving coil may be connected in series.

The outer partial winding of the stator transmitting coil and the outer partial winding of the rotor receiving coil are aligned in relation to one another and the inner partial winding of the stator transmitting coil and the inner partial winding of the rotor receiving coil are aligned in relation to one another. Here, aligned in relation to one another may mean that the respective partial windings substantially cover one another in view of the axis of rotation or an axis of symmetry of the stator element.

By way of the oppositely oriented partial windings, it is possible to reduce the susceptibility of the rotational angle sensor to substantially homogeneous alternating electromagnetic fields. If the stator transmitting coil and/or the rotor receiving coil are flooded by these fields, there is an induced voltage in each of the partial windings, but these voltages cancel one another out or are at Least reduced.

Overall, a rotational angle sensor based on this simple measurement principle can be embodied in a cost-effective manner since no expensive magnet is required. The arising measurement signals can be evaluated with a simple back transformation (based on a Clarke transformation). Furthermore, the rotational angle sensor is robust against tolerances, i.e., relatively large mechanical tolerances can be allowed during installation, and it is particularly unsusceptible to external disturbance fields.

According to an embodiment of the disclosure, the outer partial winding and the inner partial winding of the stator transmitting coil are embodied in such a way that they produce substantially the same magnetic flux. According to an embodiment of the disclosure, the outer partial winding and the inner partial winding of the rotor receiving coil are embodied in such a way that they produce substantially the same magnetic flux. The stator transmitting coil and/or the rotor receiving coil can be embodied in such a way (for instance, by a choice of the number of the conductor loops of the respective partial winding) that their respective partial windings produce the same magnetic flux if current flows therethrough (said current being of equal magnitude in the partial windings of the same coil since the partial windings are connected in series). Since partial windings are oriented in the opposite sense, voltages induced by external magnetic fields then substantially completely cancel one another in a coil. This applies, in particular, to homogeneous external magnetic fields in the region of the coils, for example.

Above, and below, "substantially" or "approximately" can mean a maximum deviation of 5% or of 1%.

According to an embodiment of the disclosure, the outer partial winding of the stator transmitting coil and/or of the rotor receiving coil have a plurality of conductor loops, which each completely circuit the stator element. According to an embodiment of the disclosure, the inner partial windings of the stator transmitting coil and/or of the rotor receiving coil have a plurality of conductor loops, which each completely circuit the stator element. By way of example, the conductor loops can be based on conductor tracks in the stator printed circuit board. These conductor loops or conductor tracks can extend in a spiral-shaped manner. Here, "completely circuit" can mean that a conductor loop encircles the axis of rotation of the rotor element or the axis of symmetry of the stator element through approximately 360°. The conductor loops on which the connectors are attached are also able to completely circuit the stator element or the rotor element (within the meaning of the application) if the connector lines lie close together.

According to an embodiment of the disclosure, an effective area of the outer partial winding of the stator transmitting coil, which corresponds to a sum of the areas spanned by its conductor loops, substantially corresponds to an effective area of the inner partial winding of the stator transmitting coil. According to an embodiment of the disclosure, an effective area of the outer partial winding of the rotor receiving coil, which corresponds to a sum of the areas spanned by its conductor loops, substantially corresponds to an effective area of the inner partial winding of the rotor receiving coil. Here, the effective area of a coil can determine the magnetic flux through the coil, which can be the product of the effective area of the coil and the current strength. After a complete circuit, each conductor loop can form a dedicated area, to which, subsequently, the further enclosed area is added for the next conductor loop after a further complete circuit.

According to an embodiment of the disclosure, the outer partial winding of the stator transmitting coil and/or of the rotor receiving coil has a plurality of conductor loops, which form a spiral, in particular when observed about an axis of symmetry of the stator element or about the axis of rotation. According to an embodiment of the disclosure, the inner partial winding of the stator transmitting coil and/or of the rotor receiving coil has a plurality of conductor loops, which form a spiral, in particular when observed about an axis of symmetry of the stator element or about the axis of rotation. Here, a spiral can be a curve whose distance from the axis of rotation or the axis of symmetry continuously increases.

According to an embodiment of the disclosure, the outer partial winding and the inner partial winding of the stator transmitting coil and/or the rotor receiving coil are arranged concentrically to an/the axis of symmetry of the stator transmitting coil or the axis of rotation. In this way, the partial windings of the stator element and of the rotor element always cover each other in the same way, or are always aligned in the same way in relation to one another, independently of the rotational angle.

According to an embodiment of the disclosure, the stator transmitting coil and/or the rotor receiving coil are embodied as planar coils in the form of conductor tracks on a stator printed circuit board or a rotor printed circuit board. It is possible for conductor tracks of the partial windings and/or of the coils to be arranged in a plurality of layers of the respective printed circuit board. It is also possible for a partial winding to be embodied as a (single conductor track) in only one layer of the associated printed circuit board.

According to an embodiment of the disclosure, the one or more stator receiving coils are arranged in a transmitting ring region of the stator element, which is delimited radially to the outside by the outer partial winding and radially to the inside by the inner partial winding of the stator transmitting coil. Consequently, the one or more stator receiving coils are only penetrated by the magnetic flux that is simultaneously produced by the two partial windings of the stator transmitting coil and/or the rotor transmitting coil. Also, the stator receiving coil or each of the stator receiving coils can have a multiplicity of partial windings oriented in the opposite sense in relation to a current flow.

According to an embodiment of the disclosure, the rotor transmitting coil is arranged in a ring region of the rotor element, which is delimited radially to the outside by the outer partial winding and radially to the inside by the inner partial winding. The rotor transmitting coil, too, can have a multiplicity of partial windings oriented in the opposite sense in respect of a current flow.

According to an embodiment of the disclosure, the stator receiving coil completely covers a receiving ring region (within the transmitting ring region), wherein the rotor transmitting coil has a plurality of sickle-shaped partial windings, which lie opposite to the receiving ring region. What this can achieve is that the measurement signal produced by the stator receiving coils (i.e., the amplitude of the induced AC voltage) depends substantially sinusoidally on the rotational angle, as a result of which the measurement signal or signals can be evaluated in a particularly simple manner.

A further aspect of the disclosure relates to a stator element and/or a rotor element for a rotational angle sensor, as described above and below.

According to an embodiment of the disclosure, the stator element comprises a stator transmitting coil and a stator receiving coil, wherein the stator transmitting coil has a circular outer partial winding and a circular inner partial winding, which is arranged within the outer partial winding and electrically connected to the outer partial winding in such a way that it is oriented in the opposite sense to the outer partial winding in respect of a current flow, and wherein the outer partial winding and the inner partial winding in particular produce substantially the same magnetic flux.

According to an embodiment of the disclosure, the rotor element comprises a rotor transmitting coil and a rotor receiving coil, wherein the rotor receiving coil has a circular outer partial winding and a circular inner partial winding, which is arranged within the outer partial winding and electrically connected to the outer partial winding in such a way that it is oriented in the opposite sense to the outer partial winding in respect of a current flow, and wherein the outer partial winding and the inner partial winding in particular produce substantially the same magnetic flux.

BRIEF DESCRIPTION OF THE DRAWINGS

Below, embodiments of the disclosure are described with reference to the attached drawings, with neither the drawings nor the description being intended to be construed as restricting the disclosure.

The figures are only schematic and not true to scale.

In the figures, the same reference signs denote the same features or features with the same effect.

DETAILED DESCRIPTION

Figure 1:
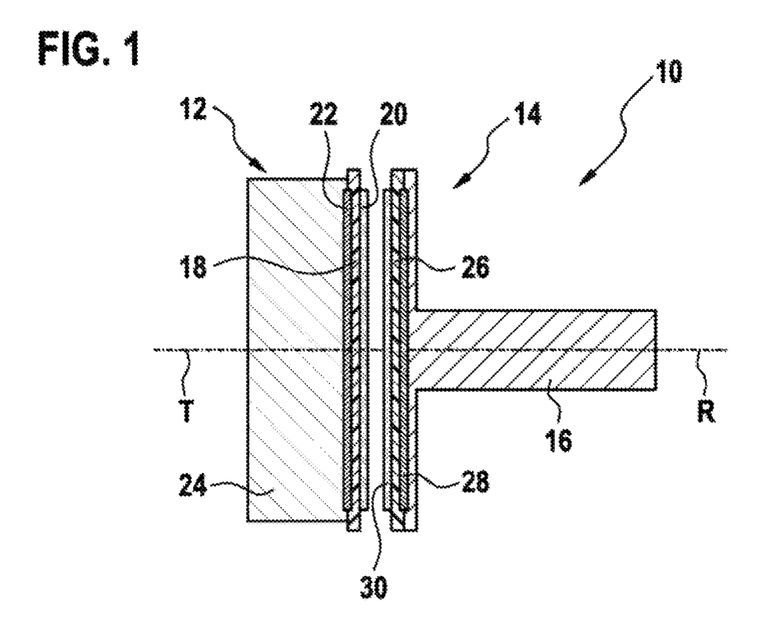
FIG. 1 schematically shows a cross section through a rotational angle sensor according to an embodiment of the disclosure.

FIG. 1 shows a rotational angle sensor 10 made of a stator element 22 and a rotor element 14. The rotor element 14 can be fastened to a shaft 16 of a component, such as, for instance, a throttle valve, a motor, a camshaft, an accelerator pedal, etc., or it can be provided by said shaft 26. The shaft 16 is rotatable about the axis of rotation R and the stator element 12 lies opposite the rotor element 14 in the corresponding axial direction. By way of example, the stator element 12 is fastened to a housing of the component. If the stator element 22 is exactly aligned in relation to the shaft 16, the axis of symmetry T of the stator element 12 corresponds to the axis of rotation R.

The stator element 12 comprises a stator printed circuit board 18, on which a stator transmitting coil 20 and one or more stator receiving coils 22 are arranged. The conductors of the coils 20, 22 can be arranged in two layers only, for example on the two sides of the stator printed circuit board 18. Further elements for a control unit 24 may be situated on the stator printed circuit board 18. The control unit 24 can supply the stator transmitting coil 20 with an AC voltage (for example, with a frequency of between 1 MHz and 20 MHz, e.g., 5 MHz, and/or with a voltage amplitude in the range of 0.5 V to 10 V, e.g., 1.5 V) and can establish an induced AC voltage in each stator receiving coil 22. On the basis of these measurements, the control unit 24 is able to determine a relative rotational angle between the stator element 12 and the rotor element 14.

The rotor element 14 comprises a rotor printed circuit board 26. A rotor receiving coil 28 and a rotor transmitting coil 30 are arranged on the rotor printed circuit board 26. The conductors of the coils 28, 30 can be arranged in two layers of the rotor printed circuit board 26 only, for example on the two sides of the rotor printed circuit board 26.

All coils 20, 22, 28, 30 are embodied as planar coils, i.e., as coils which are embodied by means of conductor tracks on and/or in one of the printed circuit boards 18, 26.

Figure 2:
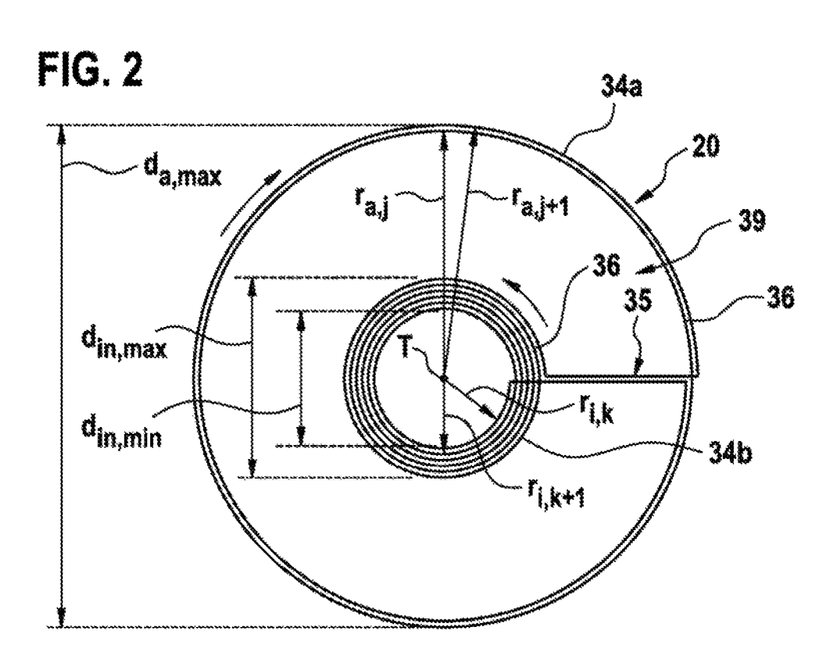
FIG. 2 schematically shows a plan view of a stator transmitting coil for a stator element according to an embodiment of the disclosure.

FIG. 2 shows the stator transmitting coil 20, which comprises an outer partial winding 34a and an inner partial winding 34b, which are connected in series via radially extending conductor tracks 35. It should be understood that the outer partial winding 34a of the stator transmitting coil 20 may be connected to the controller 24 (via connectors not illustrated here). In respect to the current flow, the outer partial winding 34a and the inner partial winding 34b are oriented in the opposite sense; i.e., as indicated by the arrows, the current in the outer partial winding 34a flows to the right when it flows to the left in the inner partial winding 34b.

Both the outer partial winding 34a and the inner partial winding 34b are ring-shaped and constructed from a plurality of virtually circular conductor loops 36, which completely circuit the axis of symmetry T. Here, the conductor loops 36 in each case form a spiral around the axis of symmetry T.

The outer partial winding 34a and the inner partial winding 34b are embodiment in such a way that they produce the same magnetic flux or chat voltages induced in the partial windings 34a, 34b by a homogeneous magnetic field cancel one another out by the series connection of the partial windings 34a, 34b.

This can be achieved by virtue of the effective areas of the partial windings 34a, 34b being of the same size. Here, the effective area of a partial winding 34a, 34b is the sum of the areas that are spanned by the conductor loops 36.

Under the assumption that each of the conductor loops is virtually circular, a circular area can be assigned to each conductor loop 36. Then, the sum of all these circular areas of the inner partial winding 34b should equal the sum of all circular areas of the outer partial winding 34a.

Now, if $r_{a,\,j}$ and $r_{a,\,j+1}$ are the (average) radii of the conductor loops 36 of the outer partial winding 34a and $r_{a,k}$ and are the (average) radii of the conductor loops 36 of the inner partial winding 34b, the following applies:

$$\sum_{k=1}^{n} \pi \cdot r_{i,k}^2 = \sum_{j=1}^{m} \pi \cdot r_{a,j}^2 \tag{1}$$

Here, provision is made of a total of n inner conductor loops 36 and m outer conductor loops 36.

If the outer partial winding 34a is assumed to be given, the geometry of the inner partial winding 34b can be determined as set forth below. Within the inner partial winding 34b, there in an area that is without coil windings. It is defined by an internal diameter $d_{in,min}$. The remaining area can be provided for a bore for leading through a shaft or for other circuit parts (components, vias, etc.), for example. Since the one or more stator receiving coils 22 are housed in a ring region 39 between the inner partial winding 34a and the outer partial winding 34b, a maximum outer diameter $d_{in,max}$ is also defined for the inner partial winding 34b. Here, $d_{in,min}=2\,r_{in,min}$ and $d_{in,max}=2\,r_{in,max}$ applies. The illustrated outer partial winding 34a has two conductor loops 36. Hence the effective area to be compensated arises as:

$$A_{out} = \sum_{j=1}^{2} \pi \cdot r_{a,j}^2 \tag{2}$$

It should be understood that it is possible to choose an appropriate effective area to be compensated in the case of 1, 3 or more conductor loops 36 or else in the case of a different geometry.

In the region predetermined by $d_{in,min}$ and $d_{in,max}$, a maximum of $$n_{max} = \frac{d_{in,max} - d_{in,min}}{2 \cdot (w+g)} \tag{3}$$

windings can be placed. Here, w denotes the conductor track width and g denotes the distance between two conductor tracks forming the conductor loops 36.

Now the overall spanned area is added:

$$A_{in} = \sum_{k=1}^{n_{max}} \pi \cdot \left(\frac{d_{i,k}}{2}\right)^2 \tag{4}$$

$$d_{I,i} = d_{in,min} + w + 2 \cdot (i-1) \cdot (w+g). \tag{5}$$

Provided $A_{in} \geq A_{out}$, the demanded condition can be satisfied. The required number n of conductor loops 36 is chosen such that $$\sum_{k=1}^{n-1} \pi \cdot \left(\frac{d_{i,k}}{2}\right)^2 < A_{out} \tag{6}$$

and $$\sum_{k=1}^{n-1} \pi \cdot \left(\frac{d_{i,k}}{2}\right)^2 \geq A_{out} \tag{7}$$

To ensure that the condition $A_{in}=A_{out}$ is satisfied exactly, the maximum inner diameter $d_{in,max}$ is subsequently reduced step-by-step until the condition is satisfied.

Both the inner partial winding 34b and the outer partial winding 34a can be embodied as multi-layer planar coils. Here, it is possible, by all means, for the number of printed circuit board layers used for the inner partial winding 34b to be larger. This reduces the requirements in terms of area of the inner partial winding 34b and allows the integration of stator receiving coils 22 with an area that is as large as possible. This produces signals with a large amplitude, which are easy to determine.

The largest outer diameter $d_{a,max}$ of the outer partial winding 34a is preferably between 10 mm and 40 mm, preferably 25 mm.

An AC voltage can be applied to the stator transmitting coil 20, said voltage having amplitudes in the range of 0.5 V to 10 V (preferably 1.5 V) with frequencies in the region of a few MHz (preferably 5 MHz).

Figure 3:
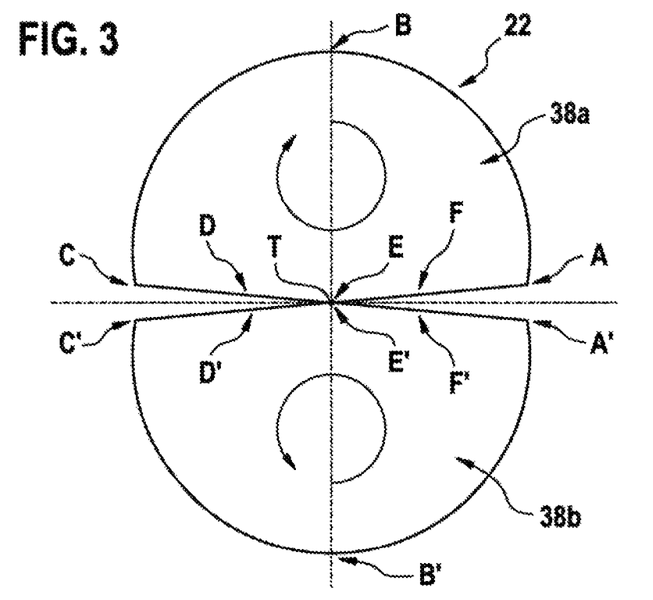
FIG. 3 schematically shows the geometry of a stator receiving coil of a stator element according to an embodiment of the disclosure.
Figure 4:
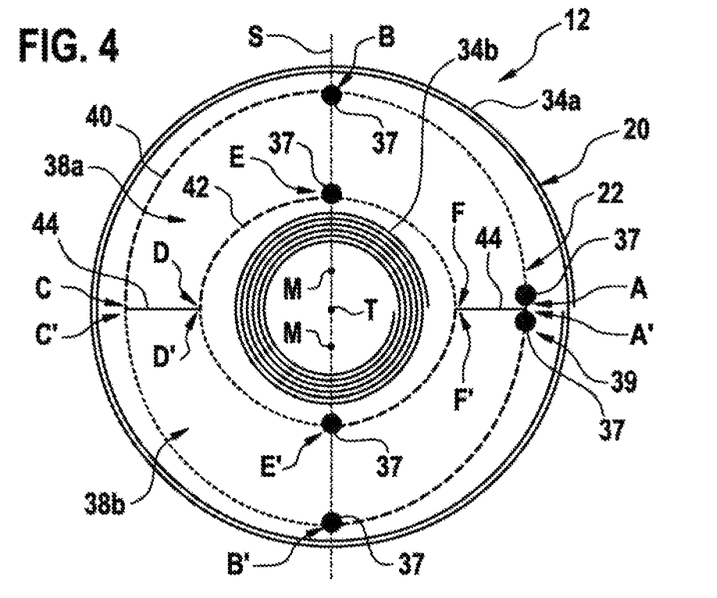
FIG. 4 shows a coil layout for a stator element according to an embodiment of the disclosure.

FIG. 3 schematically shows the geometry of a stator receiving coil 22 while FIG. 4 shows the coil layout of a stator element 12 with a stator receiving coil 22. FIG. 3 only shows the form but not the precise extent of the conductor tracks oi a stator receiving coil 22, while parts of the conductor tracks cover one another in FIG. 4. In FIG. 4, the radial conductor tracks 35 of the stator transmitting coil 20 have been omitted for reasons of clarity.

Furthermore, FIG. 4 only illustrates one stator receiving coil 22. It is possible for the stator element 12 shown in FIG. 4 to comprise two stator receiving coils 22 that are displaced by 90° in relation to one another or three stator receiving coils 22 that are displaced or twisted by 120° in relation to one another in the circumferential direction. These stator receiving coils 22 may have the same layout as the stator receiving coil 22 shown. In principle, a different number of coils with corresponding mechanical twists are also possible here.

In the stator receiving coil 22 shown, two conductor tracks lie over one another in two layers in the region of the full lines. Otherwise, each type of line represents a plane/layer of the stator printed circuit board 18. The filled circles are vias, which connect the two planes to one another.

As may be identified from FIGS. 3 and 4, the stator receiving coil 22 has two partial windings 38a, 38b which are oriented in the opposite sense or in a different sense in relation to the current flow.

What holds true in general is that each of the stator receiving coils 22 may have an even number 2m of partial windings 36a, 38b and that the measurement range Per of the rotational angle sensor 10, which may be an integer divider of 360°, for example, depends on the number 2m of the partial windings 38a, 38b of each stator receiving coil 22, where m=360°/Per applies. By way of example, with m=1, the stator receiving coils 22 from FIGS. 2 and 3 have two partial windings 38a, 38b, which leads to periodicity or a measurement range of 360°.

The same number of partial windings 38a, 38b oriented in the one direction and in the other direction leads to the partial voltages induced by the stator transmitting coil 20 (in the case of a lacking rotor element 14) compensating each other when summed and being output as an output signal of 0 V at all stator receiving coils 22. This can also be used for self-diagnostics, wherein it is possible to identify that the rotor element 14 is missing or at least has an electrical interruption. Moreover, disturbances as a consequence of EMC influences induce voltages with a different sign in each partial winding 33a, 33b (analogous to the partial, windings 34a, 34b of the stator transmitting coil 20), which compensate again by way of the series connection of the partial windings 33a, 38b (under the assumption that the disturbances are homogenous in the region of the partial windings).

By way of example, three stator receiving coils 22 can be twisted in relation to one another through an angle $\xi$ in the stator element 12, it being possible to calculate said angle according to $\xi$=Per/3 (e.g., 120° here, since Per=360°). In the case of this twist, a three-phase electrical system arises, which has an electric phase offset of 120°.

As emerges from FIG. 4, each of the partial windings 38a, 38b is delimited by a circumferential conductor 40 lying radially on the outside and a circumferential conductor 42 lying radially on the inside; these are each connected to one another by two radial conductors 44. In FIG. 4, it is only possible to identify two of the four radial conductors 44 since two radial conductors 44 in each case run over one another in covering fashion in the two planes of the stator printed circuit board 18.

The outer circumferential conductor 40 of the first partial winding 38a starts at point A (also illustrated in FIG. 3) at a via 37 and then extends in the first layer to point B at the center thereof; here, said conductor changes the layer at a further via. Subsequently, it extends in the second layer to point C. At point C, the outer circumferential conductor 40, which extends in the second layer here, is connected to a radial conductor 44, which extends in the second layer to the point D and from there merges into the inner circumferential conductor 42 of the first partial winding 38a. The inner circumferential conductor 42 of the first partial winding 38a extends from point D to point E in the second layer, switches to the first layer at the point E by means of a via 37 and then extends in the first layer to point F, where it merges into a further radial conductor 44. The further radial conductor 44 of the first partial winding 38a then extends to point A', at which the second partial winding 38b starts. The latter has the same construction as the partial winding 38a along points A' to F', except for the two layers of the stator printed circuit board 18 being interchanged.

As will still be described in more detail below, the outer circumferential conductors 40 extend along circles, the center points M of which are displaced from the axis of symmetry T in such a way that points 8, at which a via 37 is present, have a maximum radial distance. The inner circumferential conductors 42 also extend to the right and left, of the respective via 37 on circles whose center points (not illustrated for reasons of clarity) are displaced from the axis of symmetry T, however displaced in such a way that the respective vias 37 have a minimum radial distance.

Figure 5:
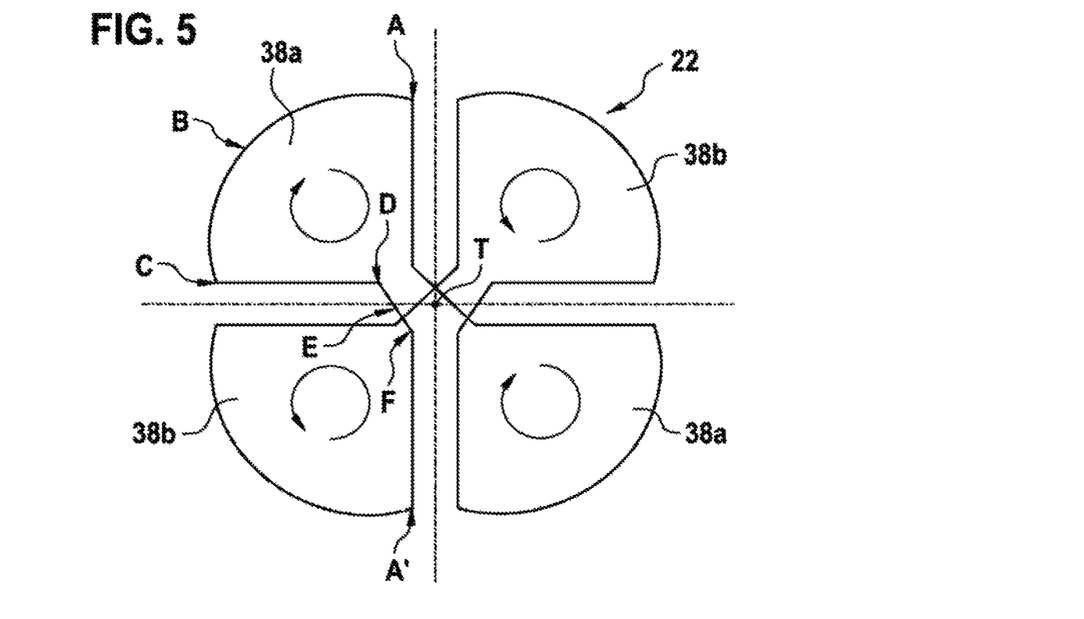
FIG. 5 schematically shows the geometry of a stator receiving coil of a rotational angle sensor according to an embodiment of the disclosure.
Figure 6:
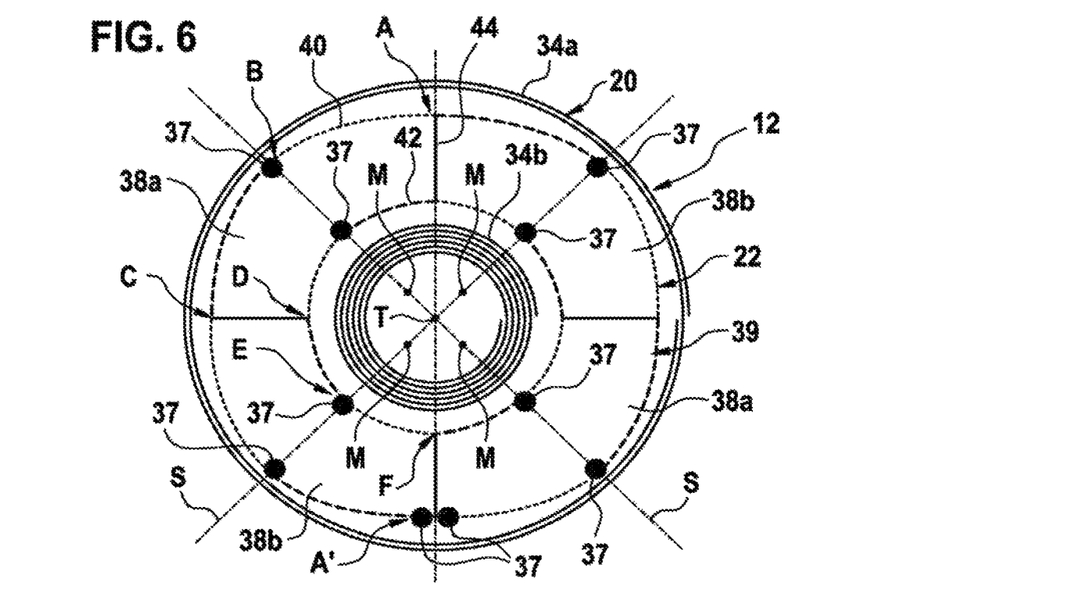
FIG. 6 shows a coil layout for a stator element according to an embodiment of the disclosure.

For reasons of clarity FIG. 5 and FIG. 6 each show only precisely one stator receiving coil 22 or a layout of a stator element 12 in a manner analogous to FIGS. 3 and 4. The real coil layout may have three stator receiving coils 22, for example, which may be twisted in relation to one another through the angle $\xi$ ($\xi$=Per/3 for three rotor receiving coils), which can be calculated as already explained above. For two rotor receiving coils, the equation is $\xi$=Per/4. The period or the measurement range is 180° in the present case.

Here, the stator receiving coil 22 has four partial windings 38a, 38b which substantially cover a circular area and which divide the circular area into four areas of equal size. Two partial windings 38a lying opposite one another in respect of the axis of symmetry T are oriented in a first direction; the other two partial windings 38b are oriented in the opposite direction, i.e., in an opposite sense.

Each of the partial windings 38a, 38b is guided in the first and second layer of the stator printed circuit board 16 along points A to A', just like the conductor tracks of FIGS. 3 and 4.

As will still be described in more detail below, the outer circumferential conductors 40 extend along circles, the center points M of which are displaced from the axis of symmetry T in such a way that points 8, at which a via 37 is present, have a maximum radial distance. The inner circumferential conductors 42 also extend to the right and left, of the respective via 37 on circles whose center points (not illustrated for reasons of clarity) are displaced from the axis of symmetry T, however displaced in such a way that the respective vias have a minimum radial distance.

In order to produce a real layout of a rotational angle sensor 10, it is possible to place further stator receiving coils 22 in a manner twisted with respect to one another along the circumferential direction. Since the only stator receiving coil 22 illustrated in FIGS. 5 and 6 is constructed from four partial windings 36a, 38b (which each cover 90° of the ring region 39 along the circumferential direction of the stator transmitting coil 20) in each case, the stator receiving coils are displaced by 60° in relation to one another in each case on account of the measurement range of 180° (see FIG. 5).

Now, the following describes a method with which the coil layout for the stator elements 12 from FIGS. 3 and 4 (measurement range of 360°) and FIGS. 5 and 6 (measurement range of 180°) can be produced, although it is not restricted to these two measurement ranges. It is for this reason that formulae that have general validity are specified.

An ideal exploitation of the ring region 39, i.e., the area lying between the outer partial winding 34a and the inner partial winding 34b, can be realized by skillful positioning of a plurality of construction circles, from which the partial windings 38a, 38b of the stator receiving coil 22 are subsequently assembled. For respectively one pair of radially opposing partial windings 38a, 38b (one pair in FIG. 4, two pairs in FIG. 6), the outer circumferential conductors 40 are defined by two construction circles which are displaced in relation to one another along the axis of mirror symmetry S of the two partial windings 38a, 38b and whose center points M are situated on this axis of mirror symmetry S.

In the case of a plurality of pairs (a total of m) of partial windings 33a, 38b, the axes of mirror symmetry S are arranged in such a way that they are respectively displaced or twisted through 180°/m in relation to one another along the circumferential direction; i.e., the two axes of mirror symmetry S of FIG. 6 are orthogonal (90°) to one another, for example.

The diameter of the construction circles can be approximately ⅓ of the diameter of the stator transmitting coil 20. The displacement of respectively two construction circles in relation to one another may be between 30% and 50% of the diameter thereof, for example 40%. In this way, it is possible, firstly, to ensure maximum use of the area and it is possible, secondly, to facilitate a realization of three twisted stator receiving coils 22 in two planes.

The radial conductors 44, which connect the outer circumferential conductors 40 to the inner circumferential conductors 42, extend radially in respect of the axis of symmetry T in this case. The outer ends of the radial conductors 44 lie on the points of intersection of the construction circles about the center points M.

The inner circumferential conductors 42, too, can be defined by construction circles, wherein two construction circles are used for each partial winding 38a, 38b, the center points of which construction circles being displaced along an axis orthogonal to the axis of mirror symmetry S of the partial windings 38a, 38b. This yields a total of 4m construction circles for the inner circumferential conductors 42. The diameter of the construction circles for the inner circumferential conductors 42 is 10% to 20%, for example 15%, of the diameter of the construction circles for the outer circumferential conductors 40.

The point of intersection of the two construction circles for an inner circumferential conductor 42 which lies closer to the axis of symmetry T in this case defines the position of the via 37.

Figure 7:
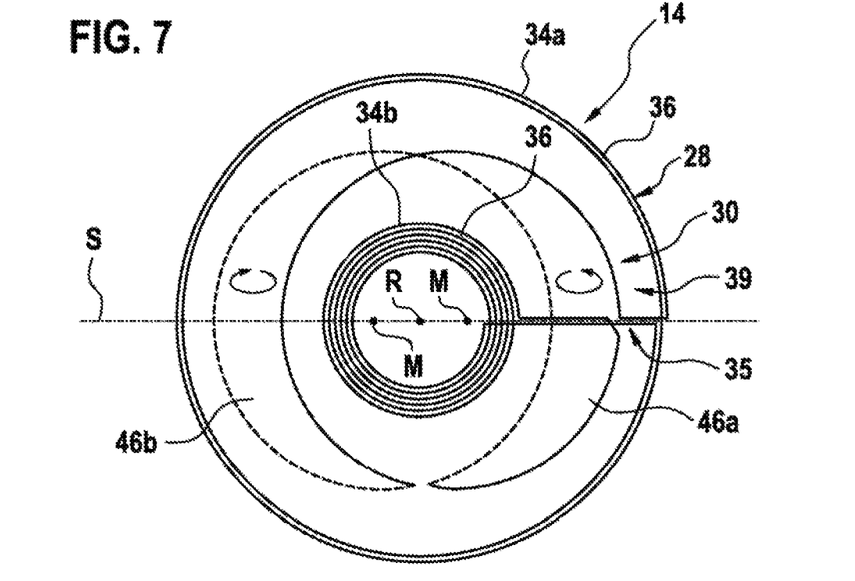
FIG. 7 shows a coil element for a rotor element according to an embodiment of the disclosure.

FIG. 7 shows a rotor element 14 for the rotational angle sensor 10 of FIG. 1 in a plan view, said rotor element comprising a rotor receiving coil 28 and a rotor transmitting coil 30 and being able to be used together with the stator element 12 from FIGS. 3 and 4.

The one rotor receiving coil 28 comprises an outer partial winding 34a and an inner partial winding 34b, which may have an analogous construction to the stator transmitting coil from FIG. 2. Here, the partial windings 34a, 34b of the rotor receiving coil 28 have the same size as the respective partial windings 34a, 34b of the stator transmitting coil 20 and cover the latter. Even in the case of the rotor receiving coil 20, the enclosed effective surfaces of conductor loops 36 running to the left and right may be identical in order to suppress electromagnetic compatibility (EMC) input coupling. In principle, other dimensions and turn ratios are also possible. Thus, for example, the number of conductor loops 36 per partial winding 34a, 34b on the rotor element 14 may also differ from the number of conductor loops 36 of the corresponding partial winding 34a, 34b on the stator element 12.

The rotor transmitting coil 30 has two partial windings 46a, 46b, which are each sickle-shaped. The first partial winding 46a is oriented in the opposite sense to the second partial winding 46b (in respect of the current flow). The geometries of the partial windings 46a, 46b can be identical. The partial windings 46a, 46b are situated in a ring region 39 of the rotor transmitting coil 30, which is arranged between the partial windings 34a, 34b. The two sickle-shaped partial windings 46a, 46b are formed from substantially circular-arc-shaped conductor portions.

The rotor receiving coil 28 and the rotor transmitting coil 30 are electrically connected to one another or connected in series. To this end, the partial winding 46a and one of the radially extending conductor tracks 35 of the rotor transmitting coil 30 are respectively cut open and cross-connected in a region where these overlap.

Figure 8:
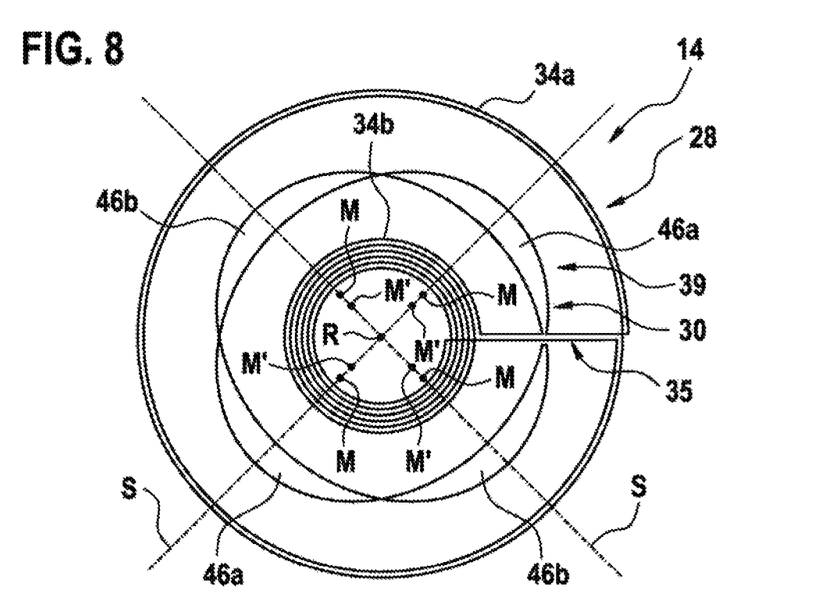
FIG. 8 shows a coil layout for a rotor element according to an embodiment of the disclosure.

FIG. 8 shows a layout of a rotor element 14, which can be used together with the stator element 12 from FIGS. 5 and 6. In FIG. 8, the rotor transmitting coil 30 is constructed from four sickle-shaped partial windings 46a, 46b, which surround the axis of rotation R in the circumferential direction and which each cover 90°. The partial windings 46a, 46b lying opposite one another in relation to the axis of rotation R have the same orientation in respect of the current flow while partial windings 46a, 46b adjacent in the circumferential direction have an opposing orientation.

The rotor transmitting coil 30 or their partial windings 46a, 46b, too, can be defined on the basis of a plurality of construction circles.

In FIG. 7 (measurement range 360°), the partial windings 46a, 46b can be defined here by two construction circles with the same diameter, the center points M of which are displaced in relation to one another along an axis of mirror symmetry S of the partial windings 46a, 46b.

In FIG. 8, the four partial windings 46a, 46b are defined by four relatively large construction circles, the center points M of which are displaced along a first distance with respect to the axis of rotation R, and four relatively small construction circles, the center points M' of which are displaced along a second distance with respect to the axis of rotation R. Here, all center points M, M' are situated on the axes of mirror symmetry S. It turns out that the best measurement signal can be obtained if the ratio of the diameters of the larger and smaller construction circles is approximately $\sqrt{2}$. It is advantageous if, at the points of Intersection of adjacent partial windings 46a, 46b, the end segments of the larger circles transition virtually without kinking into the end segments of the adjacent smaller circles.

As a last point, reference should be made to the fact that terms such as "having", "comprising", etc. do not exclude any other elements or steps and that terms such as "a" or "one" do not exclude a multiplicity. Reference signs in the claims should not be construed to be a restriction.

The invention claimed is:

1. A rotational angle sensor, comprising:
   a stator element including:
     a stator transmitting coil having:
       a first circular outer partial winding; and
       a first circular inner partial winding positioned within and electrically connected to the first outer partial winding so as to have an opposite current flow relative to the first outer partial winding; and
     a stator receiving coil; and
   a rotor element, rotatably mounted about an axis of rotation relative to the stator element, and including a rotor receiving coil and a rotor transmitting coil electrically connected to one another, the rotor receiving coil having:
     a second circular outer partial winding; and
     a second circular inner partial winding positioned within and electrically connected to the second outer partial winding so as to have an opposite current flow relative to the second outer partial winding;
   wherein the first outer partial winding and the second outer partial winding are aligned relative to each other;
   wherein the first inner partial winding and the second inner partial winding are aligned relative to each other;
   wherein the rotor receiving coil is inductively coupled to the stator transmitting coil such that an electromagnetic field produced by the stator transmitting coil induces a current in the rotor receiving coil that flows through the rotor transmitting coil and causes the rotor transmitting coil to produce a further electromagnetic field; and
   wherein the stator receiving coil is inductively coupled to the rotor transmitting coil such that the inductive coupling between the stator receiving coil and the rotor transmitting coil is configured with reference to a rotational angle between the stator element and the rotor element and such that the further electromagnetic field produced by the rotor transmitting coil induces an angle-dependent AC voltage in the stator receiving coil.

2. The rotational angle sensor as claimed in claim 1, wherein at least one of:
the first outer partial winding and the first inner partial winding of the stator transmitting coil are configured to produce a substantially same magnetic flux; and
the second outer partial winding and the second inner partial winding of the rotor receiving coil are configured to produce a substantially same magnetic flux.

3. The rotational angle sensor as claimed in claim 1, wherein at least one of:
(i) at least one of the first outer partial winding of the stator transmitting coil and the second outer partial winding of the rotor receiving coil has a plurality of conductor loops that each completely encircles the stator element or the rotor element; and
(ii) at least one of the first inner partial winding of the stator transmitting coil and the second inner partial winding of the rotor receiving coil has a plurality of conductor loops that each completely encircles the stator element or the rotor element.

4. The rotational angle sensor as claimed in claim 3, wherein at least one of:
(i) the first outer partial winding has a plurality of conductor loops that each completely encircles the stator element or the rotor element, and an effective area of the first outer partial winding of the stator transmitting coil corresponding to a sum of the areas spanned by plurality of conductor loops, substantially corresponds to an effective area of the first inner partial winding of the stator transmitting coil; and
(ii) the second outer partial winding has a plurality of conductor loops that each completely encircles the stator element or the rotor element, and an effective area of the second outer partial winding of the rotor receiving coil corresponding to a sum of the areas spanned by plurality conductor loops, substantially corresponds to an effective area of the second inner partial winding of the rotor receiving coil.

5. The rotational angle sensor as claimed in claim 1, wherein at least one of:
(i) at least one of the first outer partial winding of the stator transmitting coil and the second outer partial winding of the rotor receiving coil has a plurality of conductor loops that form a spiral about an axis of symmetry of the stator element or about the axis of rotation; and
(ii) at least one of the first inner partial winding of the stator transmitting coil and the second inner partial winding of the rotor receiving coil has a plurality of conductor loops that form a spiral about an axis of symmetry of the stator element or about the axis of rotation.

6. The rotational angle sensor as claimed in claim 1, wherein at least one of (i) the first outer partial winding and the first inner partial winding of the stator transmitting coil and (ii) the rotor receiving coil are positioned concentrically to an axis of symmetry of the stator transmitting coil or the axis of rotation.

7. The rotational angle sensor as claimed in claim 1, wherein at least one of the stator transmitting coil and the rotor receiving coil is a planar coil formed by conductor tracks on a printed circuit board.

8. The rotational angle sensor as claimed in claim 1, wherein at least one of:
the stator receiving coil is positioned in a ring region of the stator element delimited radially to the outside by the first outer partial winding and radially to the inside by the first inner partial winding of the stator transmitting coil; and
the stator receiving coil has a plurality of partial windings oriented in opposition to a current flow.

9. The rotational angle sensor as claimed in claim 1, wherein:
the rotor transmitting coil is positioned in a ring region of the rotor element delimited radially to the outside by the second outer partial winding and radially to the inside by the second inner partial winding; and
the rotor transmitting coil has a plurality of partial windings oriented in opposition to a current flow.

10. The rotational angle sensor as claimed in claim 1, wherein:
the stator receiving coil completely covers a receiving ring region; and
the rotor transmitting coil has a plurality of sickle-shaped partial windings positioned opposite to the receiving ring region.

* * * * *